J. L. SCHUELER
June 20, 1933. APPARATUS FOR WIPING MOLTEN METALLIC COATINGS Re. 18,871
Original Filed Nov. 24, 1930
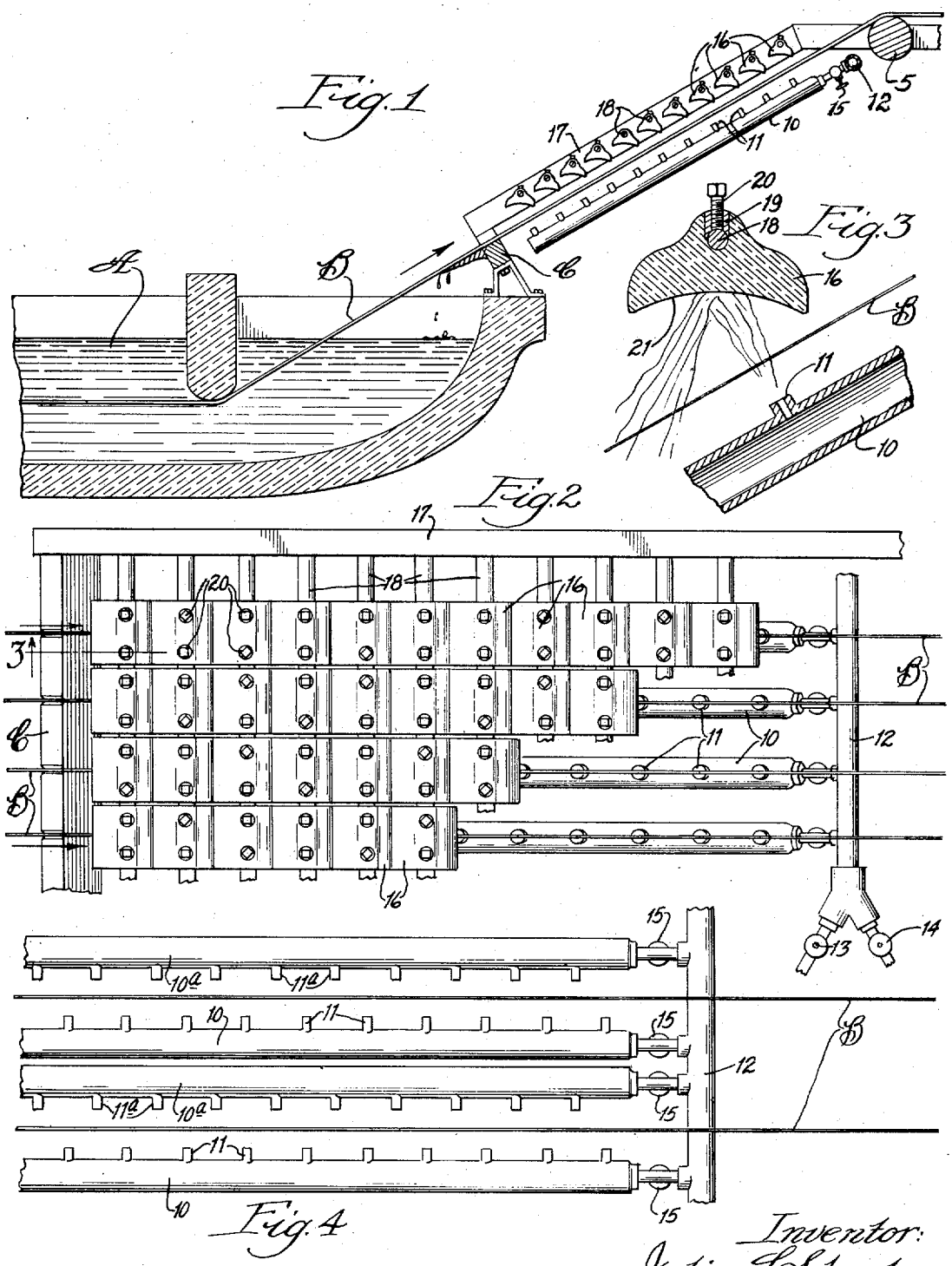
Inventor:
Julian L. Schueler,
By Manning & Manning
Attys.

Reissued June 20, 1933 Re. 18,871

UNITED STATES PATENT OFFICE

JULIAN L. SCHUELER, OF KOKOMO, INDIANA

APPARATUS FOR WIPING MOLTEN METALLIC COATINGS

Original No. 1,841,216, dated January 12, 1932, Serial No. 497,891, filed November 24, 1930. Renewed October 19, 1931. Application for reissue filed July 25, 1932. Serial No. 624,582.

This invention relates to an apparatus for the treatment of metallic coatings applied to metal bases by immersion in a molten bath, and has for its principal object the continuous wiping and smoothing of such coatings.

More specifically the present improvements relate to means for the wiping and smoothing of zinc coatings applied to iron and/or steel wire. It will be obvious that the invention is also applicable to metal coatings other than zinc, and also to metallic bodies other than wire, which lend themselves to continuous coating processes from molten baths.

This invention has for a further object the elimination of solid wipers, such as those of the asbestos and charcoal types, also the elimination of heavily coated wasters or scrap, known in the art as "reachers". Still another object of the invention is the acceleration of wire coating operations where coatings of the "charcoal wipe type" are desired.

Other objects and purposes of my invention will appear hereinafter wherein, for purposes of clarity, I have confined the description to zinc coating of iron or steel wire. As a suggestive embodiment of the invention, I have shown in the accompanying drawing an apparatus adpated for the wiping of metallic coatings, the several views being as follows:

Figure 1 which is a fragmentary vertical section through a tank containing a coating bath, shows a wire passing therefrom to be treated for the removal of adhering skimmings, dross, etc.;

Fig. 2 is an enlarged view in plan of the treating mechanism, some of the refractory blocks being removed to expose the burners therebelow;

Fig. 3 is an enlarged detail in section on line 3 of Fig. 2; and

Fig. 4 is a plan view of a slightly modified burner arrangement in which refractory blocks are dispensed with.

The wires to be treated according to this invention are first passed through a molten bath A containing zinc or other metal suitable for coating the surface of the wires under treatment. From the exit end of the bath the several wires B traveling in parallelism are taken, by preference, over a roller 5 preliminary to being wound upon one or more reels. It is between this roller and the coating bath that the several instrumentalities of my invention are located for applying to the wires while traveling between these points the wiping treatment which will now be explained.

For removing the grosser skimmings, dross, and surplus coating over that which can be evened and smoothed by flame treatment as hereafter described, it is desirable to utilize a notched friction block C. This block which may be mounted on the edge of the tank extends transversely of the several wires which are to receive simultaneous treatment. The block while removing some of the coating including the larger particles thereon does not effect a wiping of the coating to any extent.

Between the friction block and the roll 5 the traveling wires receive simultaneous treatment from apparatus which will now be explained. This consists of a plurality of header pipes 10 one arranged adjacent and parallel to each wire, and each equipped with a series of burner openings 11 which face toward the proximate wire. The several header pipes which are disposed in a common plane on one side of the wires are joined to a connecting pipe 12 receiving fuel and pressure from separate valve controlled supply pipes 13 and 14 respectively. Suitable valves 15 are provided by which to control the gas or other fuel that is admitted to each header pipe.

In the construction shown in Figs. 1, 2 and 3, I have provided a series of independently adjustable flame deflector refractory blocks 16, one for each of the burner openings. As suggestive of a mounting for these blocks, I have shown a frame 17 supporting a series of rods 18 extending transversely of the wires on a side thereof which is opposite to the plane occupied by the several burners. Mounted to swing on each of these rods are the refractory blocks, one arranged opposite each burner opening. A bushing 19 of suitable material is secured in each block and arranged radially with respect to the rod opening therein, so that an adjusting screw 20 which is threaded into the bushing may present its acting end against the rod to lock the block in a desired rotative position of adjustment. Each block face 21 confronting the burner opening is preferably concave as suggested in Fig. 3.

By the arrangement described, I provide for the introduction into the several header pipes of an air or gaseous pressure together with a combustible gas or other fuel which may be burned at the openings. It is contemplated that the flames issuing from the burner openings shall be projected onto the immediately adjacent portions of the wire surfaces to enshroud the same and also therebeyond to impinge against the concave faces of the refractory blocks from whence the flames are returned to impinge upon other portions of the wire surfaces. The force with which the flames are directed from the burner openings will depend in large part upon the strength and character of the blast used. By proper regulation of the valve controls at the pipes 13 and 14 the admitted quantities of fuel and blast and the mixture of one with the other, may be varied within considerable limits. The flames so directed against the coated wire surfaces provide what I shall term a "flame wiper".

In the construction of Fig. 4, I have shown an arrangement which dispenses with refractory blocks, and in lieu thereof utilize supplementary flames which are directed upon the wires opposite thereto and to each other. In this example each header pipe 10 co-acts with a complementary pipe $10^a$ having burner openings $11^a$ which are staggered in relation to the openings 11 in the pipe 10. Two such complementary header pipes are arranged on diametrically opposite sides of each wire with the burner openings facing each other, but in staggered relation, as shown. In other respects, both as regards their connections with a source of fuel and blast supply, and their impinging and enshrouding action upon the wires, the construction of Fig. 4 is the same as that previously described.

In operation, a wire which is roughly coated upon leaving the molten bath A parts with its dross and skimmings and some of the surplus coating material upon passing across the friction block C. To wipe the coating, the flames emerging from the several burner openings enshroud each wire while it continues its travel toward the reel. The effect of the flames so impinged against the wires upon emergence from the coating bath is to redistribute the coating material smoothly and evenly while maintained in a fluid condition. It will be noted that each wire is subjected to the action of one or more flames for a desired distance along the line of wire movement. The number and spacing of such flames, and the extent of their disposition, may be determined according to what is found to be advantageous for smoothing and evening the applied coating none of which need be removed from the wires in this treatment.

The refractory blocks cooperating with the flames may be turned to any desired angular position with respect to the burner openings. Experience has indicated it may be best that these blocks should be so tilted as to face forwardly to a slight extent, i. e., in the direction from which the wires are proceeding. By so disposing the refractory blocks, the flames which impinge thereagainst are sent back to play upon the proximate wire surfaces angularly in the direction from which they are traveling. Where the refractory blocks are dispensed with, as in the construction of Fig. 4, the several flames playing upon each wire, are oppositely directed, and in staggered relation, so as to impinge upon separated portions of the wire surface to greater advantage.

The wiping treatment applied to the wire coating in accordance with this invention is advantageous in many ways. If the wires be of small gauge and travel at high speed, then the intensity, or length, or both, of the flame wipers can be increased to render the wire coating smooth and even; or if the wires be of heavier gauge, and slower in their movements, I can retard the intensity or length of the flame wipers to best meet such conditions. It is possible also to vary these combinations to produce a short intense acting flame, or a long intense acting flame, or vice versa, and to so regulate the flame as to project its zone of greatest heat against the wire surface.

For example, a No. 12½ gauge steel wire passing through my flame wiper for approximately three seconds will be completely wiped, and so also a No. 11 gauge steel wire traveling through the same flame wiper, but of increased intensity, will be wiped smoothly and evenly by the flames. I may also pass through the same flame wiper a No. 9 gauge wire, and wipe evenly and smoothly the coating thereon.

It is contemplated that each wire of a galvanizing unit shall be acted upon by a separate and individual flame wiper. Each flame is adjusted according to the gauge of the wire, the thickness of the coating desired, and the speed at which the wire is traveling. Means may also be provided by which the flames, when once set, remain so subject to automatic control by which the intensity of the wiping is varied automatically with the speed of travel, the flames being shut off if the wire breaks, or is stopped in its travel for other reasons.

The character of the present flame wiper permits free passage of wire joints at any time. With solid wipers that maintain a pressure against the wire, the presence of a joint makes for extreme difficulty, often resulting in a break of the wire. Even when a solid wiper yields to permit passage of a joint, there is a considerable wire length, perhaps ten to fifty feet, that is unwiped, resulting in the formation of a "reacher". With the wiper of this invention no such problem is presented.

I have ascertained, furthermore, that in conjunction with the friction block, my flame wiper may treat simultaneously light and heavy coatings on the same coating unit with wires traveling at the same speed, or otherwise. In determining the position and direction of the flame to be applied to the wire, satisfactory results are obtained if the wiper be applied to the wire shortly after it emerges from the coating bath and passes the friction block, it being desirable in any case that the wiping action take place before the coating is solidified. The impinging flame re-distributes the coating material, as necessary, to remove any excess of metal at one point to other points not so heavily coated, thereby assuring a smooth and even application of the coating over the entire surface of the treated body. The amount or extent of coating redistribution may be regulated to some extent by the velocity of the flame. It is probable this smoothing and evening action is caused to some extent by a circumferential movement which the flame imparts to the coating. Satisfactory results may also be obtained with the flame applied to the wire either at right angles, or angularly of its axis, and there is no seeming difference except from an easier operating standpoint at whatever angle the wire leaves the coating bath. The length of the wire flame need not exceed two feet in many cases.

The essence of my invention resides in the controlled application of a flame, directed radially against each wire from which some of the coating has already been removed, with successive portions of the wire coating subjected to this combined action. As already indicated, the coating is wiped while its solidification is arrested, and it is by proceeding in this manner that I am enabled to achieve highly satisfactory results by the use of this invention.

I claim:

1. An apparatus for smoothing a freshly applied molten coating to a moving wire comprising a plurality of burner openings aligned upon one side of the wire, means for supplying fuel to the burner openings for producing flames issuing toward the wire for impingement thereupon through an appreciable distance lengthwise thereof, and a plurality of refractory means, one for each burner, mounted for independent adjustable movement on the opposite wire side and adapted to return the impinging flame back against the proximate wire side, the direction of each return flame being determined by the adjustment of the refractory means associated with the burner therefor.

2. In combination with the exit end of a molten metal coating bath, an apparatus for wiping freshly applied molten metal coatings on a series of moving wires as they issue from the bath, comprising a header pipe extended lengthwise of each wire and provided with burner openings facing laterally toward each wire, means for supplying fuel to each header pipe whereby flames may issue from the burner openings toward the proximate wire for impingement thereagainst throughout an appreciable distance lengthwise thereof, and individual means associated with each header pipe for regulating the flames issuing therefrom whereby to control the wiping action on the wire coating under treatment.

3. In combination with the exit end of a molten metal coating bath, an apparatus for continuously wiping a freshly applied molten metal coating on a moving body as it issues from the bath, comprising a burner having means positioned adjacent the body and on opposite sides thereof, one element of said means being substantially parallel to the line of travel of the body to direct a flame with force over the entire surface of the body to uniformly treat it for an appreciable distance in the direction of its movement.

4. In combination with the exit end of a molten metal coating bath, an apparatus for continuously wiping a freshly applied molten metal coating on a moving body as it issues from the bath, comprising a burner having means positioned adjacent the body on opposite sides thereof, said burner means extending for an appreciable distance in the direction of movement of the body for projecting a flame with force thereagainst to wipe the body, and means for varying the intensity of the flame impingement upon the body coating.

5. In combination with the exit end of a molten metal coating bath, an apparatus for continuously wiping a freshly applied molten metal coating on a moving body as it issues from the bath, comprising a burner element positioned adjacent the body and on one side thereof, flame deflecting means adjacent the body and in opposed relationship to the element, said burner element and flame deflecting means extending for an appreciable distance in the direction of movement of the body for projecting a flame with force thereagainst to uniformly treat the same.

6. In combination with the exit end of a molten metal coating bath, an apparatus for continuously wiping a freshly applied molten metal coating on a moving body as it issues from the bath, comprising burner elements positioned on opposite sides of the moving body for an appreciable distance in the direction of movement of the body, said elements being substantially parallel to the line of travel of the body and having means for projecting flames in staggered relationship upon the body to uniformly treat the same.

7. In combination with the exit end of a molten metal coating bath, an apparatus for continuously wiping a freshly applied molten metal coating on a moving body as it issues from the bath, comprising a burner having openings for projecting flames with force against the body, and refractory means opposite each opening and adjustably mounted to deflect the flame upon the body, whereby to uniformly treat the entire surface of the body for an appreciable distance in the direction of its line of travel.

8. In combination with the exit end of a molten metal coating bath, an apparatus for continuously wiping a freshly applied molten metal coating on a moving body as it issues from the bath, comprising means for removing the dross from the body, and burner means adjacent the dross removing means, said burner means characterized by an element extending for an appreciable distance substantially parallel to the direction of travel of the body and adjacent thereto, and refractory means oppositely disposed to the element for deflecting the burner flame against the body to uniformly treat it.

9. In combination with the exit end of a molten metal coating bath, an apparatus for continuously wiping a freshly applied molten coating on a moving body as it issues from the bath, comprising a burner positioned adjacent one side of the body adapted to direct a flame against the body, and refractory means adjacent the opposite side of the body adapted to reflect a portion of the flame against the body side opposite the burner.

10. In combination with the exit end of a molten metal coating bath, an apparatus for continuously wiping a freshly applied molten coating on a moving body as it issues from the bath, comprising a burner so positioned adjacent one side of the body as to direct a flame angularly against the body together with means adjacent the opposite side of the body against which the flame impinges adapted to reflect and deflect the flame back against the body side opposite the burner and angularly with respect to its direction of movement.

11. In combination with the exit end of a molten metal coating bath, an apparatus for continuously wiping a freshly applied molten metal coating on a moving body as it issues from the bath, comprising means for removing surplus coating from the body after it issues from the bath, and burner means coacting with the coating removing means and positioned away from the bath with respect to the coating removing means to direct a flame over every portion of the coated surface for a substantial distance in the line of travel of the body to equalize the distribution of the molten metal coating remaining upon the body and smooth the same.

12. In combination with the exit end of a molten metal coating bath, an apparatus for continuously wiping a freshly applied molten metal coating on a moving body as it issues from the bath, comprising means for removing from the body some of the coating thereon, burner means coacting with the coating removing means and positioned away from the bath with respect to the coating removing means to direct a flame toward the moving body, and means coacting with the burner means for directing the projection of the flame to distribute the flame over every portion of the coated surface for a substantial distance in the line of travel of the moving body to equalize the distribution of the molten metal coating remaining on the body and smooth the same, the coating removing means, burner means and means coacting therewith being so co-ordinated as to effect a removal from the body of surplus coating over that which the flames are capable of evenly distributing and smoothing.

13. In combination with the exit end of a molten metal coating bath, an apparatus for continuously wiping a freshly applied molten metal coating on a moving wire, comprising stationary means located adjacent to the bath for removing surplus coating from the wire, and burner means coacting with the coating removing means and positioned away from the bath with respect to the coating removing means to direct a flame over every portion of the coated surface for a substantial distance in the line of travel of the wire with adequate intensity to equalize the distribution around the wire of the molten metal coating remaining upon the wire.

14. In combination with the exit end of a molten metal coating bath, an apparatus for continuously wiping a freshly applied molten metal coating on a moving body after it issues from the bath, comprising burner means positioned to direct a flame toward the moving body, and deflector means coacting with the burner means for redirecting the portion of the flame passing beyond the body to distribute the flame over every portion of the coated surface for a substantial distance in the line of travel of the moving body with adequate intensity to equalize the distribution of the molten metal coating upon the body.

JULIAN L. SCHUELER.